(12) United States Patent
Spanjers et al.

(10) Patent No.: US 11,820,227 B2
(45) Date of Patent: Nov. 21, 2023

(54) FUNCTIONAL ELEMENT HAVING ELECTRICALLY CONTROLLABLE OPTICAL PROPERTIES

(71) Applicant: SAINT-GOBAIN GLASS FRANCE, Courbevoie (FR)

(72) Inventors: Robin Spanjers, Aachen (DE); Francois Hermange, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/914,693

(22) PCT Filed: Apr. 14, 2021

(86) PCT No.: PCT/EP2021/059600
§ 371 (c)(1),
(2) Date: Sep. 26, 2022

(87) PCT Pub. No.: WO2021/209474
PCT Pub. Date: Oct. 21, 2021

(65) Prior Publication Data
US 2023/0103913 A1    Apr. 6, 2023

(30) Foreign Application Priority Data

Apr. 16, 2020 (EP) .................................... 20169849

(51) Int. Cl.
*B60K 35/00* (2006.01)
*G02F 1/1334* (2006.01)
*G02F 1/1343* (2006.01)

(52) U.S. Cl.
CPC ............ *B60K 35/00* (2013.01); *G02F 1/1334* (2013.01); *G02F 1/13439* (2013.01);
(Continued)

(58) Field of Classification Search
CPC ........ B32B 17/10192; B32B 17/10761; B32B 17/10495; B32B 17/1077;
(Continued)

(56) References Cited

U.S. PATENT DOCUMENTS

2004/0227462 A1    11/2004    Utsumi et al.
2005/0227061 A1    10/2005    Slovak et al.
(Continued)

FOREIGN PATENT DOCUMENTS

DE    10 2005 007427 A1    8/2006
DE    10 2005 049081 B3    6/2007
(Continued)

OTHER PUBLICATIONS

International Search Report as issued in International Patent Application No. PCT/EP2021/059600, dated Jun. 14, 2021.
(Continued)

*Primary Examiner* — Hoan C Nguyen
(74) *Attorney, Agent, or Firm* — Pillsbury Winthrop Shaw Pittman LLP

(57) ABSTRACT

A functional element having electrically controllable optical properties having a plurality of side edges includes a stacking sequence having a first carrier film, a first planar electrode divided by an isolation line into at least two segments, an active layer, a second planar electrode, and a second carrier film, wherein on a first side edge in a first region, the second carrier film, the second planar electrode, and the active layer have a first cutback and in a second region, the first carrier film, the first planar electrode, and the active layer have a second cutback, a group of first bus bars electrically conductively contacts the first planar electrode, and each segment of the first planar electrode is electrically conductively contacted by a bus bar from the group of the
(Continued)

Figure 1:
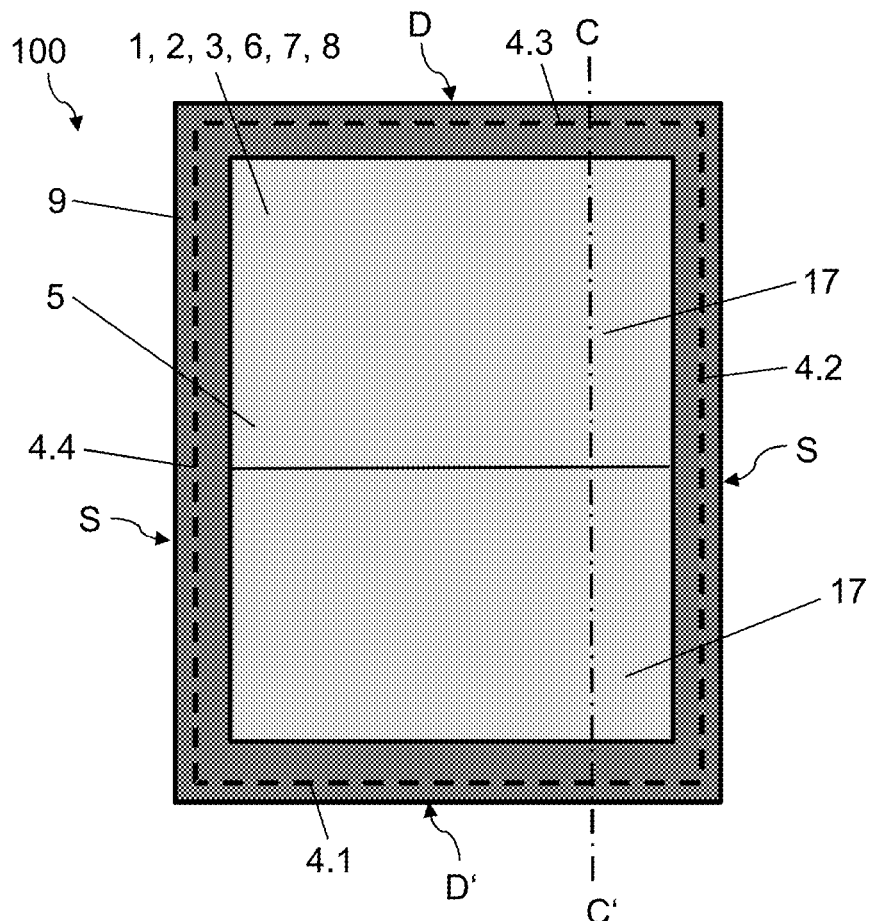

first bus bars, and at least one second bus bar electrically conductively contacts the second planar electrode.

19 Claims, 10 Drawing Sheets

(52) U.S. Cl.
CPC .... *B60K 2370/25* (2019.05); *B60K 2370/771* (2019.05); *B60K 2370/785* (2019.05)

(58) Field of Classification Search
CPC ........ B32B 17/10036; B32B 17/10504; B32B 17/10348; B32B 17/10788; G02F 1/13439; G02F 1/137; G02F 1/155; G02F 1/1334; G02F 1/15; G02F 1/13775; G02F 2001/1555; B60K 35/00; B60K 2370/771; B60K 2370/25; B60K 2370/785; B60J 3/04

See application file for complete search history.

(56) References Cited

U.S. PATENT DOCUMENTS

| | | |
|---|---|---|
| 2012/0026573 A1 | 2/2012 | Collins et al. |
| 2015/0109651 A1 | 4/2015 | Branda et al. |
| 2016/0033841 A1* | 2/2016 | Gauthier ................. G02F 1/161 219/121.72 |
| 2016/0238880 A1* | 8/2016 | Liao .................... G02F 1/13394 |
| 2018/0281570 A1 | 10/2018 | Labrot et al. |
| 2019/0049808 A1 | 2/2019 | Satoh et al. |

FOREIGN PATENT DOCUMENTS

| | | | |
|---|---|---|---|
| DE | 10 2007 027296 A1 | 12/2008 | |
| DE | 10 2008 026339 A1 | 12/2009 | |
| DE | 10 2013 001334 A1 | 7/2014 | |
| DE | 20 2018 102520 U1 | 5/2018 | |
| EP | 0 876 608 B1 | 4/2002 | |
| EP | 1 862 849 A1 | 12/2007 | |
| EP | 3 809 199 A1 | 4/2021 | |
| JP | 2001215480 A * | 8/2001 | ........... C03B 33/076 |
| JP | 2004037842 A * | 2/2004 | |
| JP | 2007256471 A * | 10/2007 | |
| JP | 2019-515841 A | 6/2019 | |
| JP | 2019-200303 A | 11/2019 | |
| KR | 20120049708 A * | 5/2012 | |
| WO | WO 98/29781 A1 | 7/1998 | |
| WO | WO 2010/112789 A2 | 10/2010 | |
| WO | WO 2010/147494 A1 | 12/2010 | |
| WO | WO 2011/028254 A2 | 3/2011 | |
| WO | WO 2011/033313 A1 | 3/2011 | |
| WO | WO 2012/007334 A1 | 1/2012 | |
| WO | WO 2014/086555 A1 | 6/2014 | |
| WO | WO 2016/171312 A1 | 10/2016 | |
| WO | WO 2017/141528 A1 | 8/2017 | |
| WO | WO 2017/157626 A1 | 9/2017 | |
| WO | WO 2019/104488 A1 | 6/2019 | |
| WO | WO 2019/244871 A1 | 12/2019 | |
| WO | WO 2020/083562 A1 | 4/2020 | |

OTHER PUBLICATIONS

Notice of Reasons for Rejection as issued in Japanese Patent Application No. 2022-562526, dated Aug. 22, 2023.

* cited by examiner

C'-C

FUNCTIONAL ELEMENT HAVING ELECTRICALLY CONTROLLABLE OPTICAL PROPERTIES

CROSS-REFERENCE TO RELATED APPLICATIONS

This application is the U.S. National Stage of PCT/EP2021/059600, filed Apr. 14, 2021, 2021, which in turn claims priority to European patent application number 20 169 849.5 filed Apr. 16, 2020. The content of these applications are incorporated herein by reference in their entireties.

The invention relates to a functional element having electrically controllable optical properties, a method for producing such a functional element, and a composite pane having such a functional element.

In the vehicle sector and in the construction sector, composite panes with electrically controllable functional elements are often used as sun screens or as privacy screens.

Thus, for example, windshields are known in which a sun visor is integrated in the form of a functional element having electrically controllable optical properties. In particular, the transmittance or the scattering behavior of electromagnetic radiation in the visible range is electrically controllable. The functional elements are usually film-like and are laminated into or glued onto a composite pane. In the case of windshields, the driver can control the transmittance behavior of the pane itself relative to sunlight. Thus, a conventional mechanical sun visor can be dispensed with. As a result, the weight of the vehicle can be reduced and space gained in the roof region. In addition, the electrical control of the sun visor is more convenient for the driver than the manual folding down of the mechanical sun visor.

Windshields with such electrically controllable sun visors are, for example, known from WO 2014/086555 A1, WO 2017/157626 A1, DE 102013001334 A1, DE 102005049081 B3, DE 102005007427 A1, and DE 102007027296 A1.

Electrically controllable sun visors are, moreover, also used in glass roofs of motor vehicles. In particular, in the case of large-area panoramic glass panes, there is a need to variably control the transmittance of the pane. Depending on the position of the sun, it is necessary to dim only subregions of the pane, or also to make the entire area non-transparent as a privacy screen in the parked vehicle.

Typical electrically controllable functional elements contain electrochromic layer structures or suspended particle device (SPD) films, as is known, for example, from US 2005/227061 A1. Further possible functional elements for realizing an electrically controllable sun screen are so-called PDLC functional elements (polymer dispersed liquid crystal), as is known, for example, from DE 20 2018 102520 U1. Their active layer contains liquid crystals that are embedded in a polymer matrix.

The electrical contacting of electrically controllable functional elements is usually done via bus bars that are attached on the planar electrodes in the edge region of the functional element and make electrically conductive contact therewith. By connecting the bus bars to an external voltage source, for example, via flat conductors attached to the bus bars, a voltage is applied to the planar electrodes and the active layer of the functional element is switched.

US 2015/109651 A1 discloses a composite pane with a switchable optical filter.

WO 2017/157626 A1 discloses a windshield with a PDLC functional element, wherein the PDLC functional element is switchable in segments.

WO 2020/083562 A1 discloses a composite pane with an electrically controllable functional element that can be switched in segments, wherein the functional element comprises a first planar electrode and a second planar electrode arranged flat one over another, between which an active layer is arranged flat, the first planar electrode is divided into multiple segments by at least one separating line, a group of first bus bars electrically conductively contacts the first planar electrode, at least one second bus bar electrically conductively contacts the second planar electrode, and wherein each segment of the first planar electrode is electrically conductively contacted by at least two bus bars from the group of the first bus bars.

In prior art PDLC functional elements that can be switched in segments, the bus bars arranged on the individual segments are generally connected individually to a voltage source by means of flat conductors.

The object of the present invention is to provide a functional element having electrically controllable optical properties that is switchable in segments and enables improved connection of the bus bars to a voltage source.

The object of the present invention is accomplished by a functional element having electrically controllable optical properties in accordance with the independent claim 1. Preferred embodiments emerge from the dependent claims.

Further aspects of the invention include improved composite panes having functional elements according to the invention and methods for producing the functional element, methods for producing the composite panes and uses thereof.

A functional element according to the invention having electrically controllable optical properties comprises at least:
a stacking sequence consisting of a first carrier film, a first planar electrode, an active layer, a second planar electrode, and a second carrier film.

In the functional element, the active layer is arranged between the first planar electrode and the second planar electrode. The planar electrodes and the active layer are arranged flat one over another. The active layer has the controllable optical properties that can be controlled by the voltage applied to the planar electrodes. The planar electrodes are electrically conductively connected to bus bars, via which the functional element can be connected to an external voltage source. In order to be able to switch the functional element in sections, in the form of individual segments, these must be electrically controllable individually. For this, the first planar electrode is divided into at least two segments by at least one isolating line. The isolating line can also be referred to as an isolation line and causes electrical separation of the individual segments of the first planar electrode from one another. A group of first bus bars is used to make electrically conductive contact with the first planar electrode, wherein each segment of the first planar electrode is contacted by a bus bar of the group of the first bus bars. The second planar electrode is electrically conductively contacted by at least one second bus bar.

The functional element has a plurality of side edges, particularly preferably four side edges. The functional element can, however, also include more than four side edges. Opposite side edges of a functional element can run parallel to one another or nonparallel. The side edges need not be straight, but often have a curve. The length of opposite side edges can differ from one another. For example, the functional element can have a trapezoidal outline. In a preferred embodiment, the functional element has a plurality of side edges, for example, four side edges, two of which are, in each case, arranged opposite one another.

According to the invention, on a first side edge, in a first region, the second carrier film, the second planar electrode, and the active layer have a first cutback; and in a second region, on the first side edge, the first carrier film, the first planar electrode, and the active layer have a second cutback. The cutbacks enable attachment of the group of first bus bars on the first planar electrode for the electrically conductive contacting thereof and the attachment of the at least one second bus bar on the second planar electrode for the electrically conductive contacting thereof.

In a through view through the functional element according to the invention in the region of the first cutback, the first bus bars are arranged adjacent one another in a row on the first planar electrode, with the first bus bars electrically separated from one another by the at least one isolation line. In a through view through the functional element according to the invention in the region of the second cutback, the at least one second bus bar is arranged on the second planar electrode.

When the functional element has two or more second bus bars, these are likewise arranged adjacent one another in a row.

In one embodiment, the first cutback and the second cutback are arranged directly adjacent one another.

As indicated above, the second carrier film, the second planar electrode, and the active layer have a first cutback on a first side edge in a first region. Thus, the first cutback is present only in a first region at the first side edge and does not extend completely along the first side edge. Consequently, the first cutback can also be referred to as a local first cutback or a first local notch. Consequently, the first cutback on the first side edge also does not extend all the way to a side edge opposite the first side edge.

In addition, as indicated above, the first carrier film, the first planar electrode, and the active layer have a second cutback in a second region on the first side edge. Thus, the second cutback is present only in a second region at the first side edge and does not extend completely along the first side edge. Consequently, the second cutback can also be referred to as a local second cutback or a second local notch. Consequently, the second cutback at the first side edge also does not extend all the way to a side edge opposite the first side edge.

Neither the first cutback nor the second cutback is thus a cut that extends along the complete first side edge or extends all the way to a side edge opposite the first side edge.

In the context of the invention, "an isolation line" means a linear region within the planar electrode that is not electrically conductive and that extends over the entire thickness of the planar electrode.

In one embodiment, the at least one isolation line is divided, starting from the first side edge, into at least one vertical section that runs substantially perpendicular to the first side edge and into at least one horizontal section that runs substantially parallel to the first side edge.

In a preferred embodiment, the at least one isolation line is divided into two vertical sections that run substantially perpendicular to the first side edge and into two horizontal sections that run substantially parallel to the first side edge, with the vertical sections and horizontal sections alternating. In this embodiment as well, the at least one isolation line begins starting from the first side edge of the functional element with a vertical section.

It goes without saying that vertical sections of the at least one isolation line are sections that run perpendicular to the first side edge and horizontal sections of the at least one isolation line are sections that run parallel to the first side edge.

Each of the first bus bars is associated with exactly one segment and is electrically separated via a section of the isolation line from all other segments, with the exception of the segment associated with this first bus bar. The maximum length of the bus bars is selected depending on the distance between the isolation lines in the region of the respective planar electrode in which the respective bus bar is arranged.

The first planar electrode is contacted with one pole of the voltage source via the group of the first bus bars by means of a first flat conductor, and the second planar electrode is contacted with the opposite pole of the voltage source via the at least one second bus bar by means of a second flat conductor. Depending on the type of functional element, the voltage source can be an AC voltage source or a DC voltage source.

The first flat conductor is a so-called flexible printed circuit (FPC).

The structure of the functional element according to the invention enables the active layer to be selectively switched in sections, with the selectively switchable regions of the active layer corresponding to a projection of the segments of the first planar electrode onto the active layer.

For the selective control of the segments, the opposing poles of a voltage source are connected, depending on the desired circuit diagram of the active layer, to the bus bars of the first planar electrode and the second planar electrode. A first pole of the voltage source is connected to the second bus bar or bars of the second planar electrode, whereas the opposite pole of the voltage source is connected to the first bus bars, which are contacted in the region of the segments of the first planar electrode to be controlled. Consequently, there is an electrical potential difference between the planar electrodes only in the regions of the functional element in which the corresponding segments of the first planar electrode are connected to the voltage source. Accordingly, the active layer of the functional element is also switched only in these regions. The isolation line between the individual segments of the first planar electrode ensures that no current flow occurs via other segments of the coating. The selective control of the segments of the first planar electrode to which a voltage is applied can be carried out, for example, via the first flat conductor in the form of a flexible printed circuit.

The arrangement according to the invention enables an improved connection of the bus bars to a voltage source. In particular, due to their arrangement at the first side edge in a row, the first bus bars can be connected to the pole of a voltage source by a single flat conductor in the form of a flexible printed circuit. As a result of the contacting of all segments directly with a single flat conductor in the form of a flexible printed circuit, inserting wires between the connector and the segments is avoided.

The majority of the surface areas of the segments of the first planar electrode are arranged substantially parallel to one another.

The number of segments within the first planar electrode can vary depending on the field of application of the glazing and is generally between 2 and 20, preferably between 3 and 10.

In a particularly preferred embodiment, only one second bus bar, via which the entire second planar electrode is electrically conductively contacted, is attached on the second planar electrode.

The electrical control of the functional element is done, for example, by knobs, rotary controls, or sliders, that are, for example, integrated into the dashboard of a vehicle. However, a switch area, for example, a capacitive switch area, for control can also be integrated into the composite pane. Alternatively, the functional element can also be controlled by contactless methods, for example, by gesture recognition, or as a function of the pupil or eyelid state detected by a camera and suitable evaluation electronics.

The at least one isolation line is introduced into the planar electrodes such that the segments of the first planar electrode are electrically isolated from one another. The individual segments are connected to the voltage source independently of one another such that they can be actuated separately. Thus, different regions of the functional element can be switched independently. Particularly preferably, the majority of the surface areas of the segments are arranged horizontally in the installed position. Thus, the height of the non-transparent region of the functional element can be controlled by the user. The term "horizontal" is construed broadly here and refers to a propagation direction that runs between the side edges of the composite pane, for example, the side edges of a roof panel or a windshield. The isolation lines need not necessarily be straight, but, instead, can even be slightly curved, preferably adapted to any curvature of the nearest pane edge, in particular substantially parallel to the front roof edge of a roof panel or a windshield.

The isolation lines have, for example, a width of 5 µm (microns) to 500 µm, in particular 20 µm to 200 µm. The width of the segments can be suitably selected by the person skilled in the art in accordance with the requirements in the individual case.

The isolation lines can be introduced by laser ablation during production of the functional element. Preferably, already laminated multilayer films can be subsequently segmented by laser ablation.

In WO 2016/171312 A1 and WO 2019/104488 A1, laser ablation methods for use in the production of functional elements are described.

The first bus bar and the second bus bar comprise an electrically conductive structure, preferably containing silver, and have a thickness of 5 µm to 40 µm.

The bus bars are intended to be connected to an external voltage source such that there is a difference in electrical potential between the first planar electrode and the second planar electrode.

In a preferred embodiment, the bus bars are implemented as a printed and baked conductive structure. The printed bus bars contain at least one metal, preferably silver. The electrical conductivity is preferably realized via metal particles contained in the bus bar, particularly preferably via silver particles. The metal particles can be situated in an organic and/or inorganic matrix such as pastes or inks, preferably as baked screen printing paste with glass frits. The layer thickness of the printed bus bars is preferably from 5 µm to 40 µm, particularly preferably from 8 µm to 20 µm, and most particularly preferably from 10 µm to 15 µm. Printed bus bars with these thicknesses are technically simple to realize and have advantageous current carrying capacity.

Alternatively, the bus bars are implemented as strips of an electrically conductive film. In that case, the bus bars contain, for example, at least aluminum, copper, tinned copper, gold, silver, zinc, tungsten, and/or tin or alloys thereof. The strip preferably has a thickness of 10 µm to 500 µm, particularly preferably of 30 µm to 300 µm. Bus bars made of electrically conductive films with these thicknesses are technically simple to realize and have advantageous current carrying capacity. The strip can be electrically conductively connected to the planar electrode, for example, via a soldering compound, via an electrically conductive adhesive or an electrically conductive adhesive tape, or by direct placement. To improve the conductive connection, a silver-containing paste, for example, can be arranged between the planar electrode and the bus bar.

The bus bars are in each case attached flat on the first planar electrode and the second planar electrode. This is advantageous in terms of easy attachment of the bus bars. Moreover, in terms of its mechanical stability, flat contacting is preferable to contacting via the surface cross-section. The bus bars run in the vicinity a first side edge of the functional element and are in each case attached flat on the planar electrode to be contacted. The bus bars preferably have, in each case, a distance of 1 mm to 50 mm, particularly preferably of 1 mm to 5 mm, from the nearest side edge, i.e., from the first side edge of the functional element.

The planar electrodes are preferably designed as transparent, electrically conductive layers.

The planar electrodes preferably contain at least one metal, one metal alloy, or one transparent conducting oxide (TCO). The planar electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The planar electrodes preferably have a thickness of 10 nm to 2 µm, particularly preferably from 10 nm to 1 µm, most particularly preferably from 10 nm to 30 nm. The planar electrodes can, in principle, be formed by any electrically conductive layer that can be electrically contacted.

Preferably, the first carrier film and/or the second carrier film contain(s) at least one polymer that does not fully melt in the autoclave process, preferably polyethylene terephthalate (PET). Particularly preferably, the first and the second carrier film are made of a PET film. This is particularly advantageous in terms of the stability of the multilayer film. The carrier films can, however, also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene-propylenes, polyvinyl fluoride, and/or ethylene tetrafluoroethylene. The thickness of each carrier film is preferably from 0.1 mm to 1 mm, for example, 0.20 mm. The carrier films according to the invention are preferably transparent. The planar electrodes are preferably arranged on one surface of the carrier film, i.e., on exactly one of the two sides of the carrier film (i.e., on its front side or its rear side). The carrier films are oriented in the layer stack of the multilayer film such that the planar electrodes are arranged adjacent the active layer.

In addition to the active layer, the planar electrodes, and the carrier films, the functional element can, of course, have other layers known per se, for example, barrier layers, blocking layers, antireflection layers, protective layers, and/or smoothing layers. It goes without saying that when one or more of these layers is present, these additional layers must also be cut back for the contacting of the first planar electrode or the second planar electrode.

In the context of the invention, the term "electrically controllable optical properties" means those properties that are continuously controllable but equally also those that can be switched between two or more discrete states.

In an advantageous embodiment, the functional element according to the invention is a PDLC functional element (polymer dispersed liquid crystal). The active layer of a PDLC functional element contains liquid crystals that are embedded in a polymer matrix. When no voltage is applied to the planar electrodes, the liquid crystals are aligned in a disorderly manner, resulting in strong scattering of the light passing through the active layer. When a voltage is applied to the planar electrodes, the liquid crystals align themselves in a common direction and the transmittance of light through the active layer is increased. Such a functional element is known, for example, from DE 102008026339 A1.

The advantages mentioned occur, however, not only in connection with PDLC elements, but also, analogously, with other functional elements. In other possible embodiments, the active layer is an SPD, an electrochromic, or an electroluminescent layer.

An SPD (suspended particle device) functional element contains an active layer comprising suspended particles, with the absorption of light by the active layer being variable by application of a voltage to the planar electrodes. The change in absorption is based on the alignment of the rod-shaped particles in the electric field when electric voltage is applied. SPD functional elements are known, for example, from EP 0876608 B1 and WO 2011033313 A1.

In an electrochromic functional element, the active layer of the functional element is an electrochemically active layer. The transmittance of visible light depends on the rate of ion storage in the active layer, with the ions provided, for example, by an ion storage layer between an active layer and a planar electrode. The transmittance can be influenced by the voltage applied to the planar electrodes, which causes a migration of the ions. Suitable functional layers contain, for example, at least tungsten oxide or vanadium oxide. Electrochromic functional elements are known, for example, from WO 2012007334 A1, US 20120026573 A1, WO 2010147494 A1, and EP 1862849 A1. The production of electrochromic elements is described in WO 2011/028254 A2 and WO 9829781.

In electroluminescent functional elements, the active layer contains electroluminescent materials, in particular organic electroluminescent materials whose luminescence is stimulated by the application of a voltage. Electroluminescent functional elements are known, for example, from US 2004227462 A1 and WO 2010112789 A2. The electroluminescent functional element can be used as a simple light source or as a display with which any presentations can be shown.

The invention also relates to a composite pane having a functional element according to the invention with electrically controllable optical properties. The composite pane according to the invention comprises a first pane and a second pane that are joined to one another via an intermediate layer and a functional element according to the invention that is embedded in the intermediate layer.

The functional element is integrated between the first pane and the second pane of the composite pane via an intermediate layer. The intermediate layer preferably comprises a first thermoplastic bonding film, which bonds the functional element to the first pane, and a second thermoplastic bonding film, which bonds the functional element to the second pane. Typically, the intermediate layer is formed by at least the first and the second thermoplastic bonding films, which are arranged flat one over another and are laminated to one another, with the functional element inserted between the thermoplastic bonding films. The regions of the bonding films overlapping the functional element then form the regions that bond the functional element to the panes. In other regions of the pane where the thermoplastic bonding films make direct contact with one another, they can fuse during lamination such that the two original layers may no longer be discernible and, instead, there is a homogeneous intermediate layer.

A thermoplastic bonding film can, for example, be formed by a single thermoplastic film. A thermoplastic bonding film can also be formed from sections of different thermoplastic films whose side edges are adjacent each other. In addition to a first thermoplastic bonding film or a second thermoplastic bonding film, additional thermoplastic bonding films can also be present. These can, if need be, also be used for embedding additional films comprising functional layers, for example, infrared-reflecting layers or acoustically damping layers.

The thermoplastic bonding films can also include tinted or colored regions. Such films can be obtained, for example, by coextrusion. Alternatively, an untinted film section and a tinted or colored film section can be combined to form a thermoplastic bonding film. The tinted or colored region can be homogeneously colored or tinted, in other words, can have location-independent transmittance. However, the tinting or coloring can also be inhomogeneous; in particular, a transmittance progression can be realized. In one embodiment of a windshield, the transmittance level in the tinted or colored region decreases at least in sections with increasing distance from the front roof edge of the windshield. Thus, sharp edges of the tinted or colored region can be avoided such that the transition from a sun visor to the transparent region of the windshield is gradual, which is aesthetically more attractive.

In an advantageous embodiment, the region of the thermoplastic composite pane oriented in the direction of a pane used as an outer pane of a vehicle, i.e., the region between the functional element and the outer pane, is tinted. This creates a particularly aesthetic impression of the vehicle observed from the outside. The region of the other thermoplastic composite pane between the functional element and the inner pane can, optionally, be additionally colored or tinted.

In a preferred embodiment, the functional element, more precisely the side edges of the functional element, are circumferentially surrounded by a thermoplastic frame film. The frame film is implemented like a frame with a cutout into which the functional element is inserted. The thermoplastic frame film can be formed by a thermoplastic film in which the cutout had been cut out. Alternatively, the thermoplastic frame film can also be composed of a plurality of film sections around the functional element. Thus, the intermediate layer is formed, in a preferred embodiment, from a total of at least three thermoplastic bonding films arranged flat one over another, wherein the frame film, as the middle layer, has a cutout in which the functional element is arranged. During production, the thermoplastic frame film is arranged between the first and the second thermoplastic bonding film, with the side edges of all thermoplastic films preferably situated congruently. The thermoplastic frame film preferably has roughly the same thickness as the functional element. This compensates for the local difference in thickness of the composite pane, which is introduced by the locally limited functional element, such that glass breakage during lamination can be avoided.

The side edges of the functional element visible in a through view through the composite pane are preferably arranged flush with the thermoplastic frame film such there is no gap between the side edge of the functional element and the associated side edge of the thermoplastic frame film. This is true in particular for the lower edge of a functional element as a sun visor of a windshield, in which this edge is typically visible. Thus, the boundary between the thermoplastic frame film and the functional element is visually less conspicuous.

Automobile glazings, in particular windshields, rear windows, and roof panels, usually have a surrounding peripheral masking print made of an opaque enamel, which serves in particular to protect the adhesive used for installation of the pane against UV radiation and to obscure it visually. This peripheral masking print is preferably also used to obscure the edges of the functional element that are situated in the edge region of the glazing. In the case of the composite pane according to the invention, the bus bars and the required electrical connections are also installed in the region of the masking print. In this manner, the functional element is advantageously integrated into the appearance of the composite pane. Preferably, at least the pane used as the outer pane has such a masking print; particularly preferably, both the first pane and the second pane (inner pane and outer pane) are printed such that through-vision is prevented from both sides.

The functional element can also have cutouts or holes, for instance, in the region of so-called sensor windows or camera windows. These regions are provided to be equipped with sensors or cameras whose function would be impaired by a controllable functional element in the beam path of, for example, rain sensors.

The functional element is preferably arranged over the entire width of the composite pane, minus an edge region on both sides with a width of, for example, 2 mm to 20 mm. The functional element preferably also has a distance from the upper edge of, for example, 2 mm to 20 mm. The functional element is thus encapsulated within the intermediate layer and is protected against contact with the surrounding atmosphere and against corrosion.

The first thermoplastic bonding film and the second thermoplastic bonding film and the optional thermoplastic frame film as well, preferably contain at least polyvinyl butyral (PVB), ethylene vinyl acetate (EVA), and/or polyurethane (PU), particularly preferably PVB.

The thickness of each thermoplastic bonding film as well as the frame film, if present, is preferably from 0.2 mm to 2 mm, particularly preferably from 0.3 mm to 1 mm, in particular from 0.3 mm to 0.5 mm, for example, 0.38 mm. The thickness of each thermoplastic bonding film can, for example, also be 0.78 mm.

The first pane and the second pane are preferably made of glass, particularly preferably of soda lime glass, as is customary for window panes. The panes can, however, also be made of other types of glass, for example, quartz glass, borosilicate glass, or aluminosilicate glass, or of rigid clear plastics, for example, polycarbonate or polymethyl methacrylate. The panes can be clear, or also tinted or colored. If the composite pane is used as a windshield, it should have adequate light transmittance in the central field of view, preferably at least 70% in the primary through-vision zone A per ECE-R43.

The outer pane, the inner pane, and/or the intermediate layer can have other suitable coatings that are known per se, for example, antireflection coatings, non-stick coatings, anti-scratch coatings, photocatalytic coatings, or solar protection coatings or low-E coatings.

The thickness of the first pane and the second pane can vary widely and thus be adapted to the requirements in the individual case. The first pane and the second pane preferably have thicknesses of 0.5 mm to 5 mm, particularly preferably of 1 mm to 3 mm, most particularly preferably of 1.6 mm to 2.1 mm. For example, the first pane as a thickness of 2.1 mm; and the second pane, a thickness of 1.6 mm.

In one embodiment of the composite pane according to the invention, the first pane is the inner pane and the second pane is the outer pane. In an alternative embodiment, the first pane is the outer pane and the second pane is the inner pane.

In a preferred embodiment of the composite pane according to the invention, it is designed as a roof panel of a motor vehicle. The roof panel comprises a front roof edge that is adjacent the windshield of the vehicle, a rear roof edge that points in the direction of the rear window, and two side edges that extend along the vehicle doors between the front roof edge and the rear roof edge. The functional element is designed as large-area shading of the roof panel, wherein the functional element is arranged on an area of at least 80% of the entire through-vision region of the roof panel, preferably at least 90%, for example, 100%, of the entire through-vision region.

In the roof panel according to the invention, the functional element is arranged in the composite pane such that the first side edge of the functional element is aligned parallel to the front roof edge and/or parallel to the rear roof edge, and that the first side edge of the functional element is aligned adjacent the front roof edge or the rear roof edge.

The functional element as roof shading has a plurality of lamellae, which correspond in their dimensions and arrangement to the segments of the first planar electrode and can be switched selectively. The segments of such a vehicle roof are preferably selected substantially larger in area than with sun visors. The functional element is preferably divided into 2 to 6, particularly preferably into 3 to 4 lamellae, wherein the lamellae run with the majority of their area substantially orthogonal to the direction of travel of the vehicle. The segments thus extend primarily between the two side edges of the roof panel. Each segment of the first planar electrode is contacted by a first bus bar that is attached on the first planar electrode in the vicinity of the first side edge of the functional element. The second planar electrode of the functional element is contacted via at least one second bus bar, which is likewise arranged at the first side edge of the functional element. The first bus bars situated at the first side edge of the functional element and the at least one second bus bar are concealed by the opaque masking print customarily used in the edge region of the pane. Thus, the roof panel with a switchable functional element has an attractive appearance.

In a preferred embodiment of the roof panel, the region of the thermoplastic intermediate layer, via which the functional element is joined to the outer pane or to the inner pane, is tinted or colored. The transmittance of this region in the visible spectral range is thus reduced compared to a non-tinted or non-colored layer. The tinted/colored region of the thermoplastic intermediate layer thus lowers the transmittance of the windshield in the region of the sun visor. The tinted or colored region of the thermoplastic intermediate layer preferably has transmittance in the visible spectral range of 10% to 50%, particularly preferably of 20% to 40%. Particularly good results are thus achieved in terms of glare protection and optical appearance.

In a preferred embodiment, the composite pane according to the invention is a windshield of a motor vehicle. The windshield has an upper edge and a lower edge as well as two side edges extending between the upper edge and the lower edge. The upper edge, the lower edge, and the two side edges form together the circumferential edge of the composite pane. The term "upper edge" refers to that edge which is intended, in the installed position, to point upward in the direction of the vehicle roof. The upper edge is usually referred to as the "roof edge" or "front roof edge". The term "lower edge" refers to that edge which is intended, in the installed position, to point downward toward the hood of the vehicle. The lower edge is generally referred to as the "engine edge". The side edges of the windshield are the pane edges adjacent the so-called "A pillars" of the vehicle body in the installed state.

Windshields have a central field of view whose optical quality is subject to stringent requirements. The central field of view must have high light transmittance (typically greater than 70%). Said central field of view is, in particular, that field of view that is referred to by the person skilled in the art as field of view B, vision region B, or zone B. The field of view B and its technical requirements are specified in Regulation No. 43 of the Economic Commission for Europe of the United Nations (UN/ECE) (ECE-R43, "Uniform Provisions Concerning the Approval of Safety Glazing Materials and Their Installation on Vehicles"). The field of view B is defined there in Annex 18.

In this embodiment of the windshield, the functional element is a sun visor and is arranged above the central field of view (field of view B). This means that the functional element is arranged in the region between the central field of view and the front roof edge of the windshield. The functional element need not cover the entire region but is positioned completely within this region and does not protrude into the central field of view. In other words, the functional element is nearer the upper edge of the windshield than the central field of view. Thus, the transmittance of the central field of view is not impaired by the functional element, which is situated at a position similar to that of a conventional mechanical sun visor in the downward pivoted state.

The intermediate layer in the central field of view of the windshield is clear and transparent. This ensures that the through-vision through the central field of view is unrestricted such that the pane can be used as a windshield. The term "a transparent thermoplastic layer" means a layer with light transmittance in the visible spectral range of at least 70%, preferably at least 80%. The transparent intermediate layer is present at least in the field of view A, preferably also in the field of view B per ECE-R43.

The windshield is preferably intended for a motor vehicle, particularly preferably for a passenger car.

The functional element as a sun visor has a plurality of lamellae, which correspond in their dimensions and arrangement to the segments of the first planar electrode and can be switched selectively. At least one isolation line, whose horizontal sections run substantially parallel to the front roof edge, is introduced into the first planar electrode and divides the planar electrode into at least two segments. The segments thus extend primarily between the two side edges of the windshield. Each segment of the first planar electrode is in each case contacted by a first bus bar that is attached, in the vicinity of the roof edge of the windshield, at the first side edge of the functional element on the first planar electrode of the functional element. The second planar electrode of the functional element is contacted via at least one second bus bar that is attached adjacent the roof edge of the windshield at the first side edge of the functional element on the second planar electrode of the functional element. The first bus bar arranged on the first side edge of the functional element in the vicinity of the roof edge of the windshield and the at least one second bus bar are concealed in the edge region of the pane by the opaque masking print customarily used for windshields. The windshield thus has an electrically switchable sun visor with an attractive appearance.

In a composite pane implemented as a windshield, the functional element according to the invention is arranged in the composite pane such that the first side edge of the functional element is aligned parallel to and adjacent the roof edge.

In one possible embodiment, a region of the thermoplastic intermediate layer, via which the functional element is joined to the outer pane or the inner pane, is tinted or colored. The transmittance of this region in the visible spectral range is thus reduced compared to a non-tinted or non-colored layer. The tinted/colored region of the thermoplastic intermediate layer thus lowers the transmittance of the windshield in the region of the sun visor. In particular, the aesthetic impression of the functional element is improved because the tinting results in a more neutral appearance that is more pleasant to the viewer.

The tinted or colored region of the thermoplastic intermediate layer preferably has transmittance in the visible spectral range of 10% to 50%, particularly preferably of 20% to 40%. Particularly good results in terms of protection against dazzling and optical appearance are thus achieved.

The invention also relates to a method for producing a functional element according to the invention having electrically controllable optical properties having a plurality of side edges, wherein at least a) a stacking sequence consisting of a first carrier film, a first planar electrode, an active layer, a second planar electrode, and a second carrier film is provided,
b) in the first planar electrode of the functional element at least one isolation line that divides the first planar electrode into at least two segments is introduced into the first planar electrode of the functional element,
c) on a first side edge in a first region, the second carrier film, the second planar electrode, and the active layer are provided with a first cutback, and in a second region, the first carrier film, the first planar electrode, and the active layer are provided with a second cutback,
d) a first bus bar per segment is attached in each case on the first planar electrode such that the first bus bars, in a through view, are arranged adjacent one another in a row in the region of the first cutback on the first planar electrode, and at least one second bus bar is attached on the second planar electrode such that the at least one second bus bar, in a through view, is arranged in the region of the second cutback on the second planar electrode.

The at least one isolation line can preferably be introduced by a laser method. The isolation lines are preferably generated by means of laser-induced degeneration within the planar electrodes. One such laser-induced degeneration is, for example, the removal of the planar electrode or a chemical change in the planar electrode. By means of the laser-induced degeneration, an interruption of the electrical conductivity of the layer is achieved. A pulsed solid-state laser is preferably used as the laser.

The isolation lines are preferably produced through the carrier film nearest the planar electrode to be processed. The laser is focused through this carrier film onto the planar electrode.

It goes without saying that the steps b) and c) can also be carried out in reverse order.

The isolation lines can also be introduced after the arrangement of the first bus bars on the planar electrode. In this embodiment of the method, in step d) the first bus bars must be placed on the first planar electrode such that after the introduction of the isolation lines, one first bus bar per segment is attached on the first planar electrode.

The bus bars can, in particular, be attached by placement, printing, soldering, or gluing.

The bus bars are preferably implemented in the form of a printed and baked conductive structure. The printed bus bars contain at least one metal, preferably silver. Suitable silver printing pastes are commercially available and known to the person skilled in the art.

When using the method according to the invention for contacting, the contacting of the first and the second bus bar is done on the first or second planar electrode starting from different surfaces of the multilayer film. Thus, for the contacting of a first planar electrode on a first carrier film, the second carrier film is cut back, the active layer is removed, and the bus bars are attached from the side of the removed second carrier film. Analogously, for the contacting of the second planar electrode on the second carrier film, the first carrier film is cut back. Accordingly, when this method is used, the first bus bars and the second bus bars are not positioned congruently, but, instead, are positioned adjacent one another.

Functional elements as multilayer films are commercially available. The functional element to be integrated and provided with cutbacks, isolation lines, and bus bars is typically cut in the desired shape and size from a multilayer film of larger dimensions. This can be done mechanically, for example, with a knife. In an advantageous embodiment, the cutting is done using a laser. It has been demonstrated that, in this case, the side edge is more stable than with mechanical cutting. With mechanically cut side edges, there can be a risk that the material will pull back, which is visually conspicuous and adversely affects the aesthetics of the pane.

The method can additionally include the steps of attaching a first flat conductor on the group of the first bus bars, by means of which the group of the first bus bars can be contacted with a first pole of a voltage source and attaching a second flat conductor on the at least one second bus bar, by means of which the second planar electrode can be contacted with a second pole of the voltage source opposite the first pole.

Any prints present, for example, opaque masking prints and printed bus bars for the electrical contacting of the functional element are preferably applied by screen printing.

The invention also includes a method for producing a composite pane according to the invention, wherein at least
a) a functional element according to the invention, a first pane, an intermediate layer, and a second pane are provided,
b) the functional element and the intermediate layer are arranged between the first pane and the second pane,
c) the first pane and the second pane are joined by lamination via the intermediate layer.

The functional element can be produced as described above.

Optionally, in addition to said intermediate layer and the functional element further thermoplastic bonding films and/or carrier films with functional layers can be arranged in step b) between the first pane and the second pane.

The lamination in step c) is preferably carried out under the action of heat, vacuum, and/or pressure. Methods for lamination known per se can be used, for example, autoclave methods, vacuum bag methods, vacuum ring methods, calender methods, vacuum laminators, or combinations thereof.

The side edges of the functional element in the vicinity of which bus bars are situated on the functional element are preferably arranged at a distance of 0 mm to 100 mm, preferably 1 mm to 50 mm, particularly preferably 1 mm to 20 mm, from the circumferential edge of the composite pane. As a result, the pane area equipped with the functional element is advantageously enlarged. Furthermore, the bus bars can, in this manner, be concealed by the circumferential masking print customary in the automotive sector in the edge region of windshields and roof panels. Side edges of a functional element on which there are no bus bars can, for example, also be positioned in the region of the composite pane that is visible after installation.

The invention also includes the use of a composite pane according to the invention having a functional element having electrically controllable optical properties as interior glazing or exterior glazing in a vehicle or a building and the functional element according to the invention having electrically controllable optical properties as a sun screen or as a privacy screen.

Figure 2:
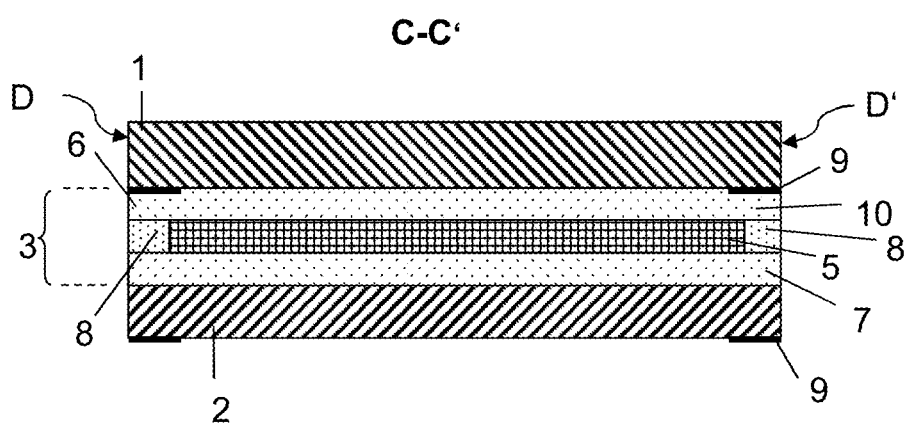
Figure 3:
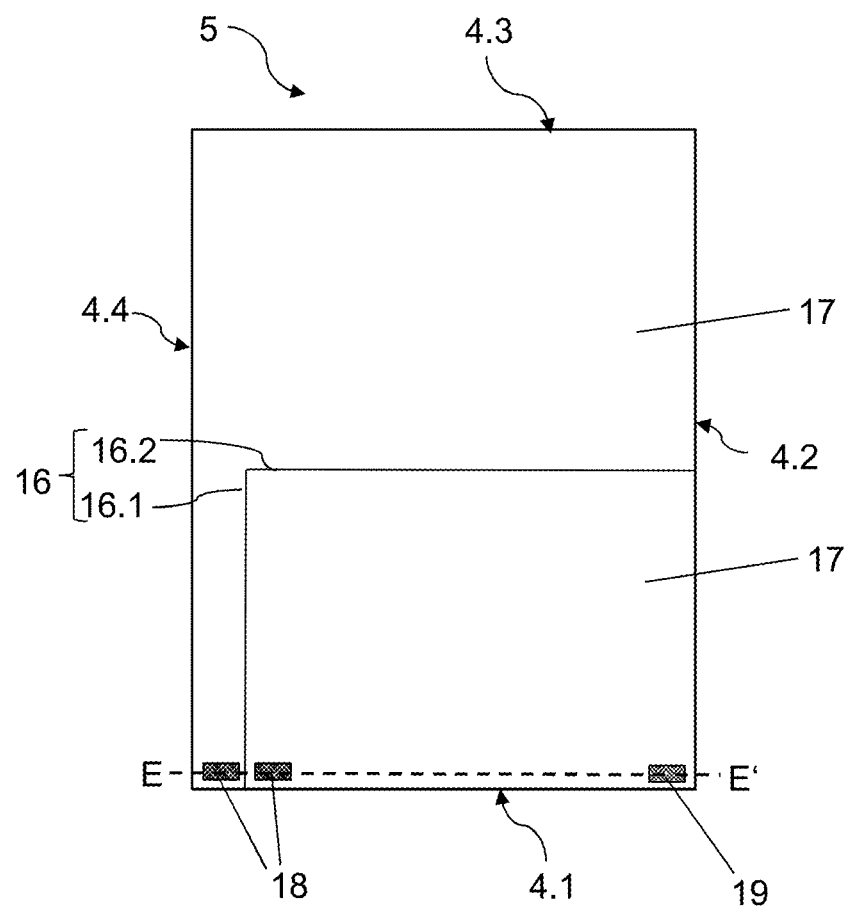
Figure 4:
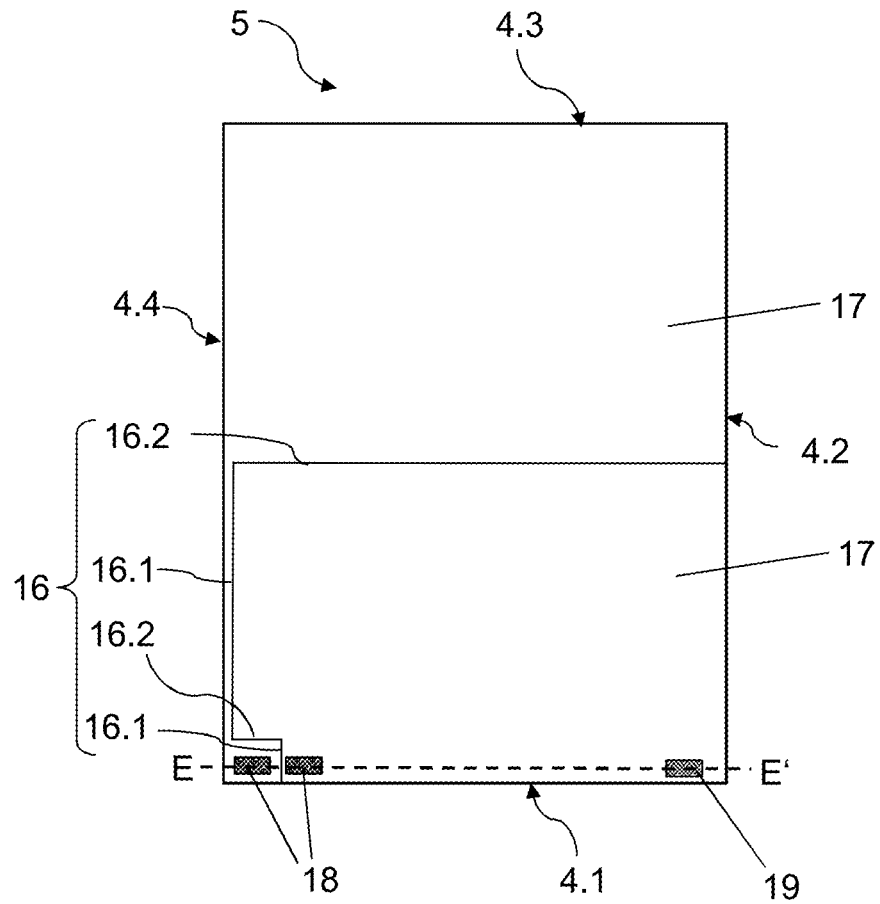
Figure 5:
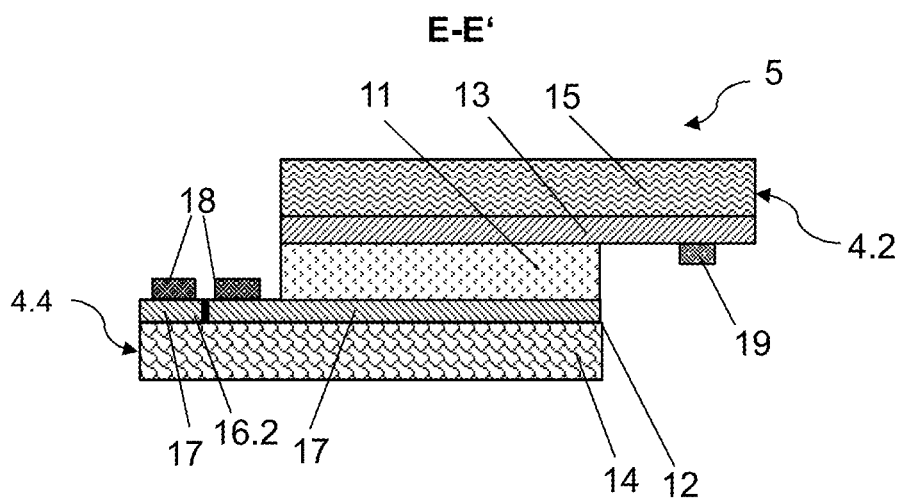
Figure 6:
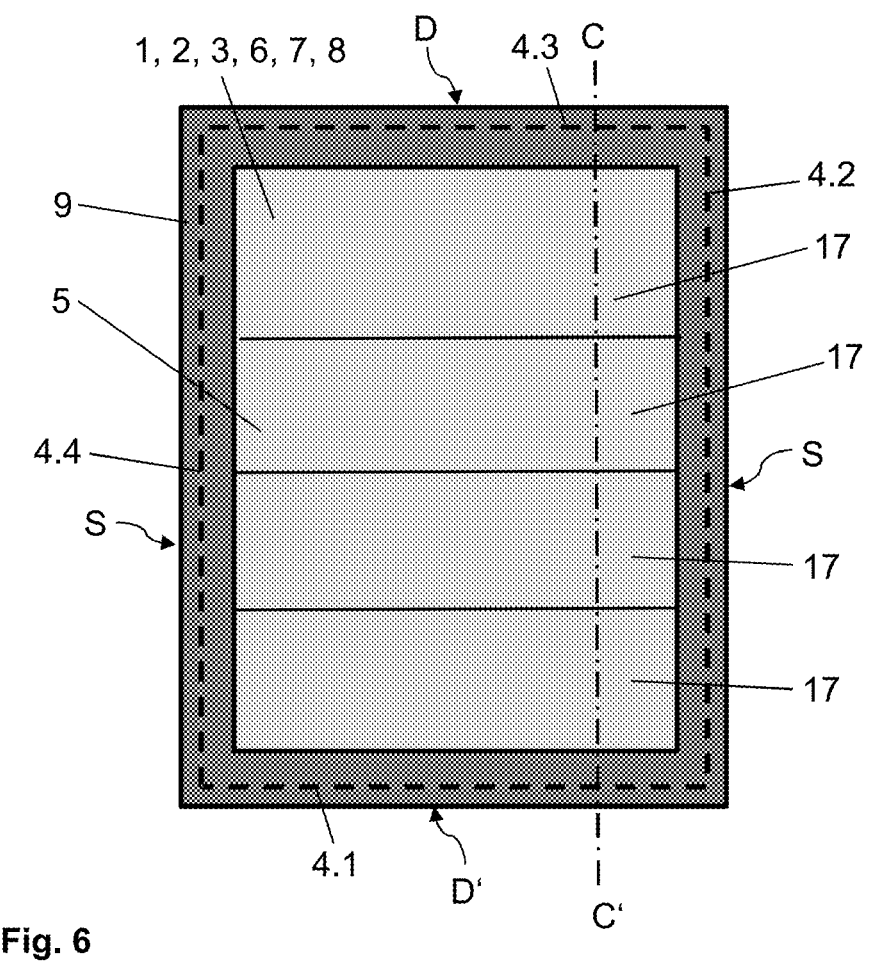
Figure 7:
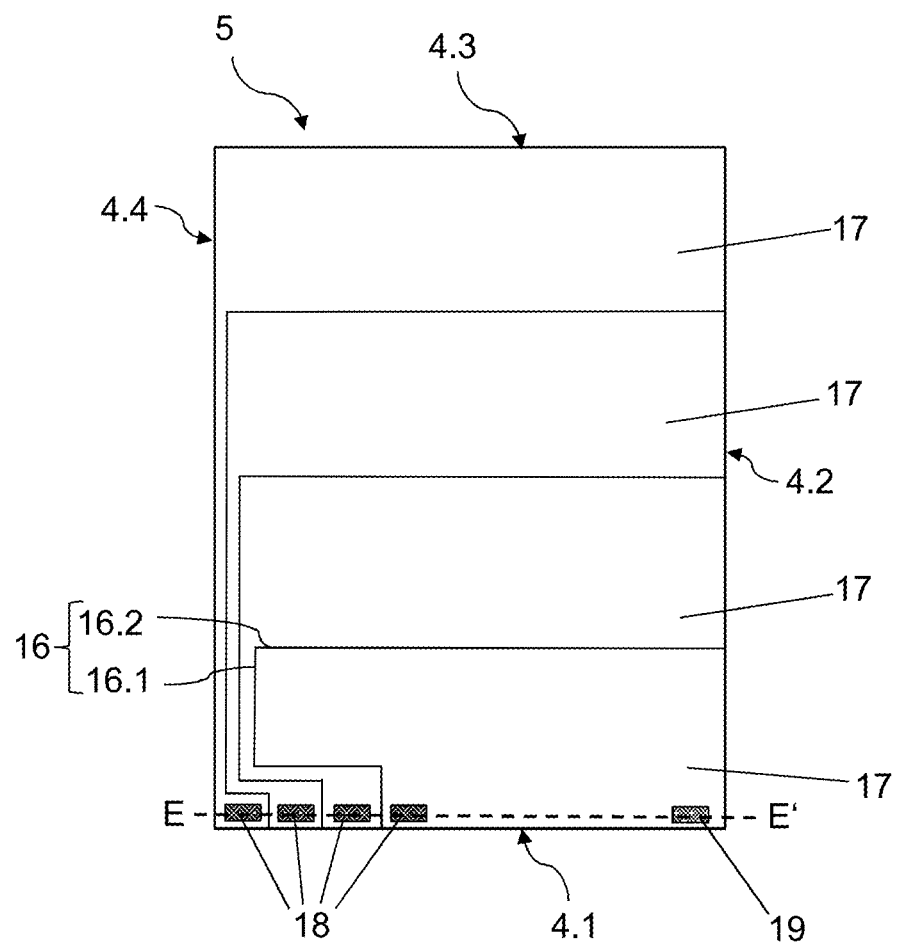
Figure 8:
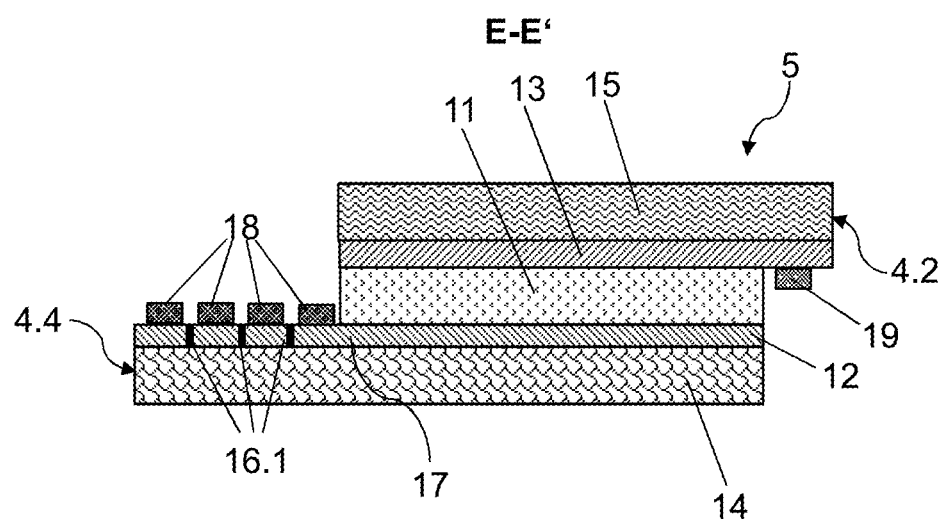
Figure 9:
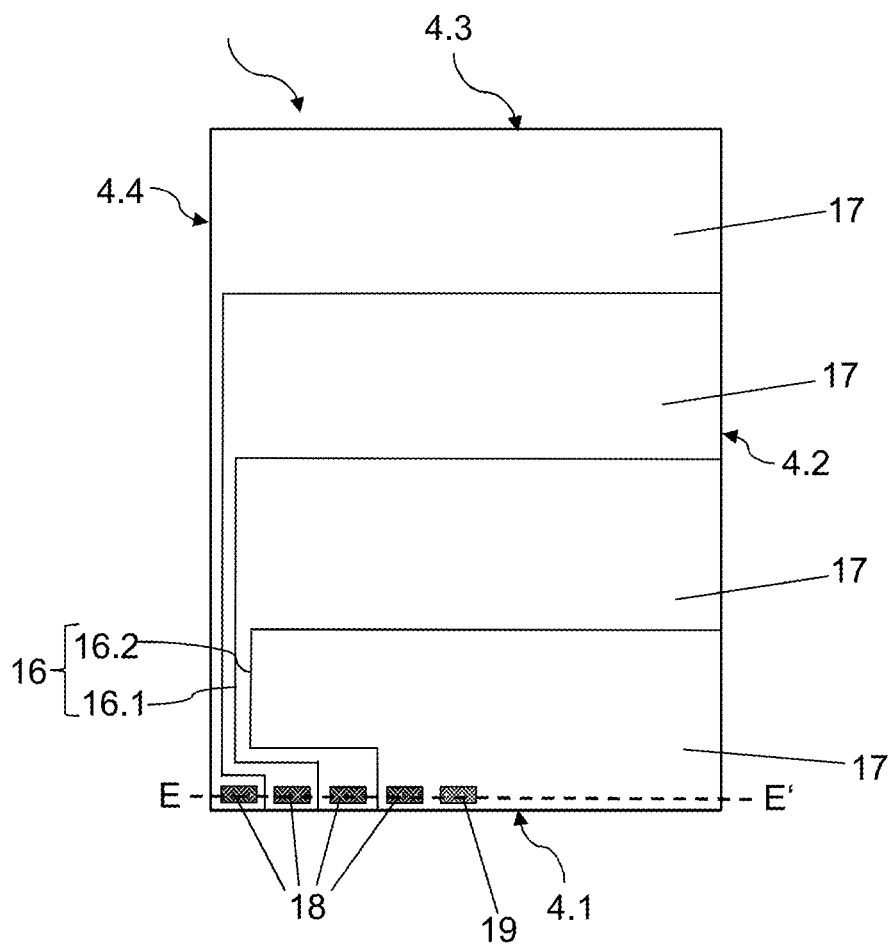
Figure 10:
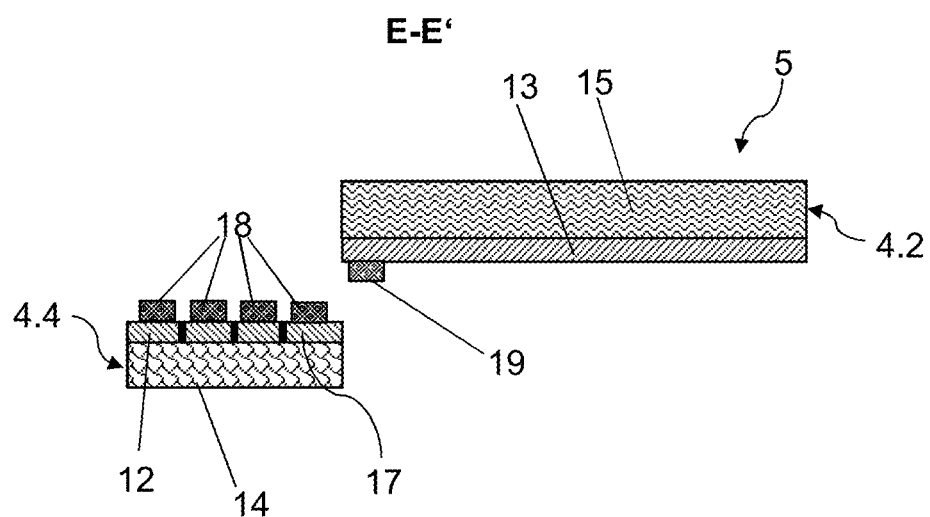
Figure 11:
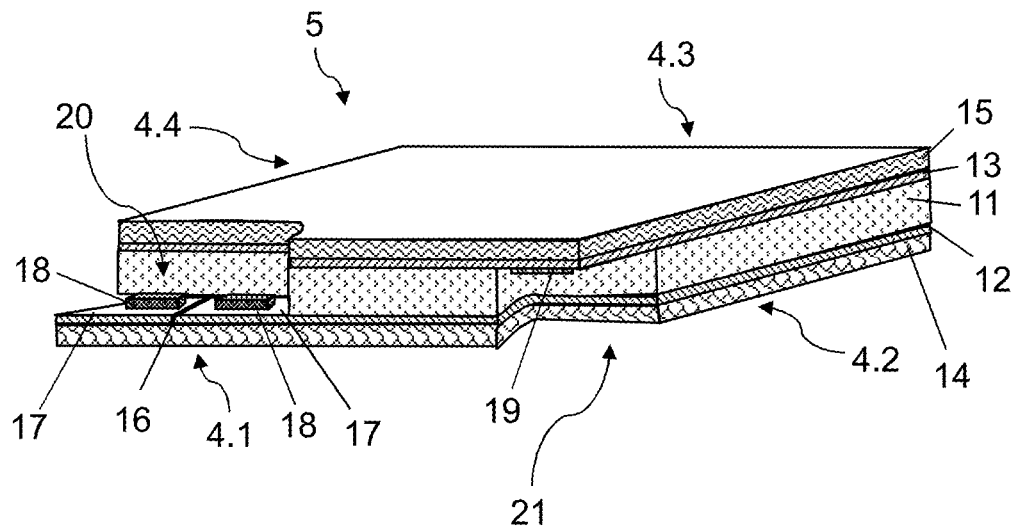
Figure 12:
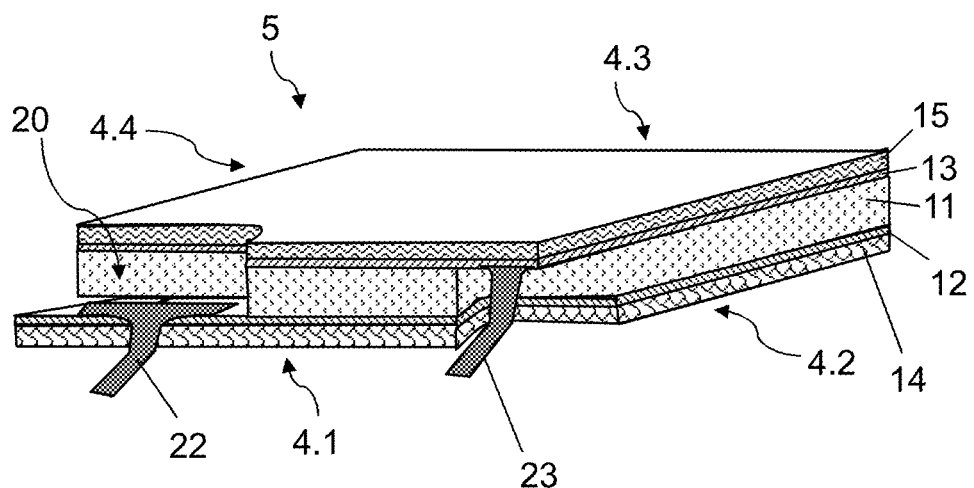
Figure 13:
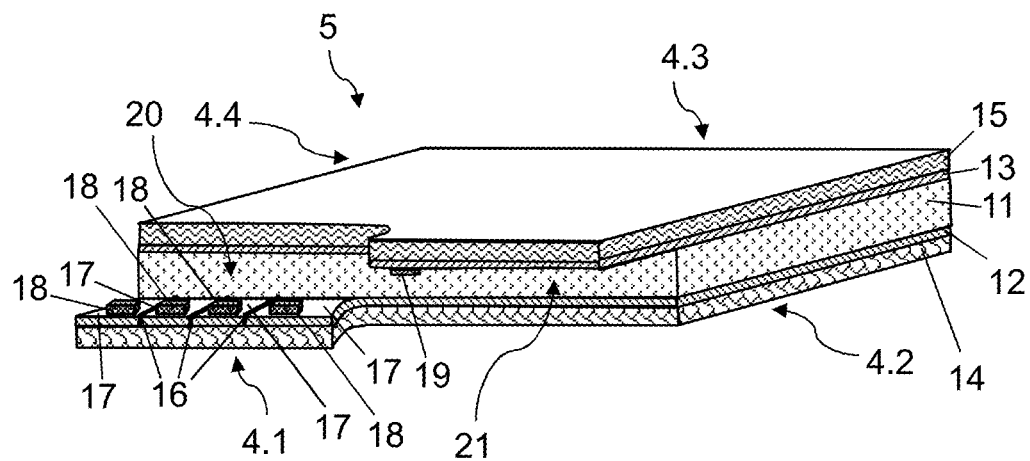
Figure 14:
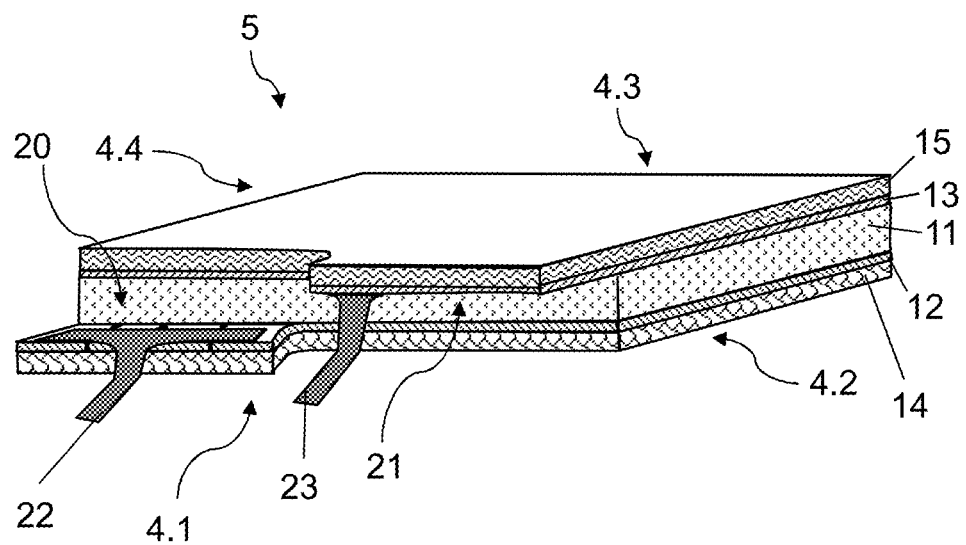
Figure 15:
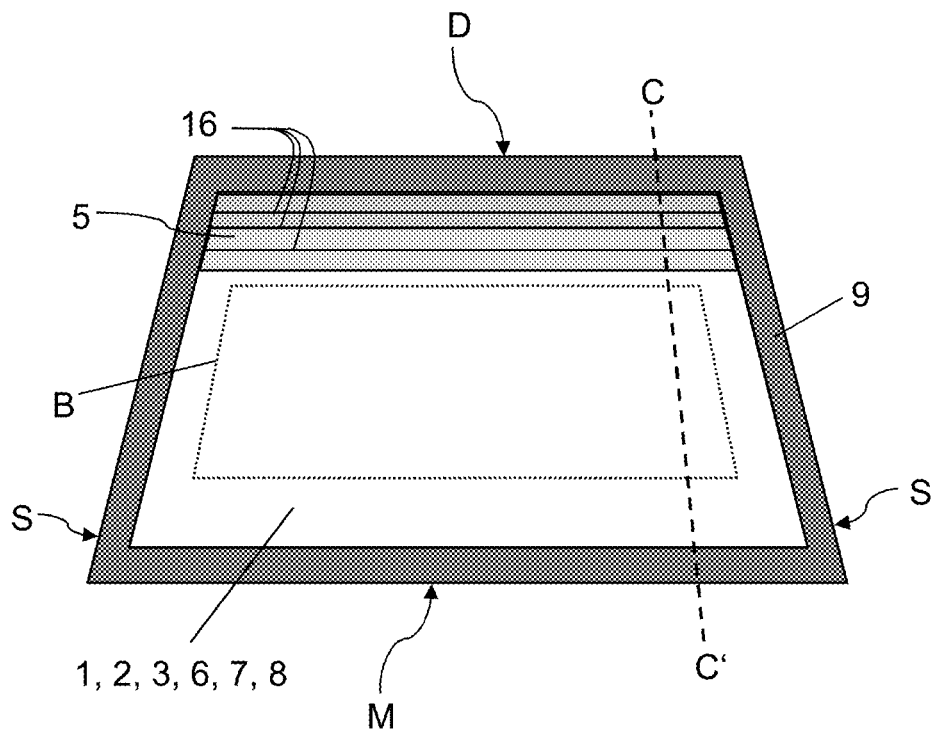
Figure 16:
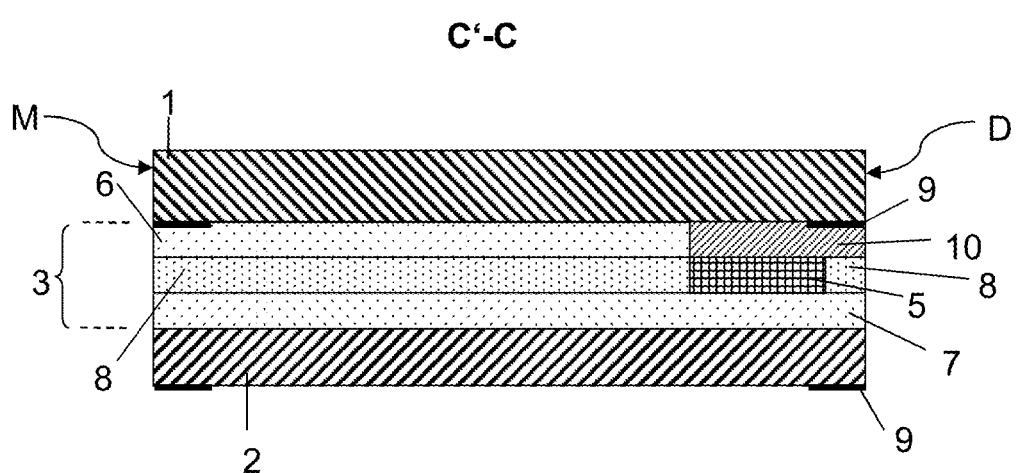
Figure 17:
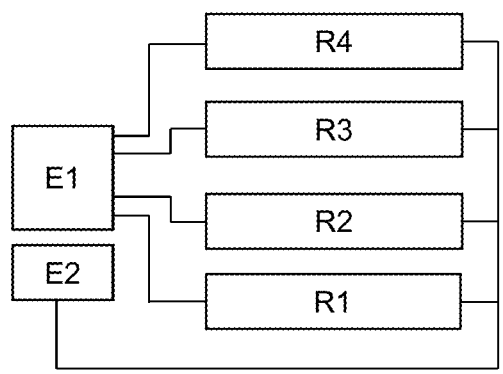
Figure 18:
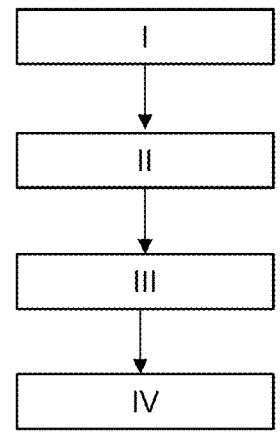

The invention is explained in detail with reference to drawings and exemplary embodiments. The drawings are schematic representations and are not to scale. The drawings in no way restrict the invention. They depict:

FIG. 1 a plan view of an embodiment of a composite pane 100 according to the invention, FIG. 2 a cross-section through the composite pane according to the invention of FIG. 1 along the section line CC', FIG. 3 a plan view of an embodiment of a functional element 5 according to the invention, FIG. 4 a plan view of another embodiment of a functional element 5 according to the invention, FIG. 5 a cross-section through the functional element 5 of FIG. 3 or 4 along the section line EE', FIG. 6 a plan view of another embodiment of a composite pane 100 according to the invention, FIG. 7 a plan view of another embodiment of a functional element 5 according to the invention, FIG. 8 a cross-section through the functional element 5 of FIG. 7 along the section line EE', FIG. 9 a plan view of another embodiment of a functional element 5 according to the invention, FIG. 10 a cross-section through the functional element 5 of FIG. 9 along the section line EE', FIG. 11 a perspective view of an embodiment of a functional element 5 according to the invention, FIG. 12 a perspective view of another embodiment of a functional element 5 according to the invention, FIG. 13 a perspective view of another embodiment of a functional element 5 according to the invention, FIG. 14 a perspective view of another embodiment of a functional element 5 according to the invention, FIG. 15 a plan view of another embodiment of a composite pane 100 according to the invention, FIG. 16 a cross-section through the composite pane according to the invention of FIG. 15 along the section line CC', FIG. 17 a circuit of an embodiment of a functional element 5 according to the invention, and FIG. 18 an exemplary embodiment of the method according to the invention using a flow chart.

FIG. 1 depicts a plan view of an embodiment of a composite pane 100 according to the invention that is implemented as roof panel, and FIG. 2 depicts a cross-sectional view of the composite pane 100 of FIG. 1 along the section line CC'. The roof panel comprises a first pane 1 that serves as an outer pane and a second pane 2 that serves as an inner pane. Here, the inner pane is the pane facing the vehicle's interior, whereas the outer pane points toward the vehicle's surroundings. The first pane 1 and the second pane 2 are joined to one another via an intermediate layer 3. The first pane 1 is made of clear soda lime glass with a thickness of 2.1 mm. The second pane 2 is made of soda lime glass with a thickness of 1.6 mm and is tinted gray. The tinted inner glass contributes to the attractive appearance of the pane, even for the vehicle occupant when looking through the roof panel. The composite pane as a roof panel has a front roof edge D in the installed position of the windshield and a rear roof edge D' facing the rear window in the installed position.

The roof panel is equipped with a functional element 5 as a large-area shading, wherein the functional element 5 is embedded in the intermediate layer 3. The intermediate layer 3 comprises a total of three thermoplastic bonding films 6, 7, 8, which are in each case formed by a thermoplastic film with a thickness of 0.38 mm made of PVB. The first thermoplastic bonding film 6 is bonded to the first pane 1; the second thermoplastic bonding film 7, to the second pane 2. The thermoplastic frame film 8 positioned therebetween has a cutout, into which the functional element 5 is inserted flush on all sides. The third thermoplastic layer 8 thus forms, so to speak, a sort of passepartout for the functional element 5, which is thus encapsulated all around in thermoplastic material and protected thereby. Depending on the thickness of the multilayer film and the resultant difference in thickness relative to the region without the functional element 5, the frame film 8 can be dispensed with. This is also dependent on the complexity of the bending of the composite pane. Generally speaking, in the case of small differences in thickness between areas with a functional element and areas without a functional element and in the case of low complexity of the bending, a frame film can be dispensed with. The first thermoplastic bonding film 6 and the second thermoplastic bonding film 7 are tinted gray in order to make the appearance of the roof panel attractive.

Optionally, an additional thermoplastic bonding film (not shown) can be introduced adjacent the outer pane (first pane 1). Carrier films with functional layers, for example, a carrier film with an infrared reflecting coating, can be incorporated via the additional thermoplastic bonding film. The infrared reflecting coating is oriented in the direction of the first pane 1 (outer pane) and serves to reduce the heating of the passenger compartment by solar radiation.

The roof panel according to the invention has a circumferential masking print 9 that conceals both the adhesive bond of the windshield to the vehicle body and also the electrical contacting of the planar electrodes of the functional element 5. The distance of the functional element 5 from the front roof edge D, from the rear roof edge D', and from the side edges of the roof panel is less than the width of the masking print 9 such that the side edges 4.1, 4.2, 4.3, 4.4 of the functional element 5 are concealed by the masking print 9. The electrical connections are also reasonably attached in the region of the masking print 9 and are thus advantageously concealed.

FIG. 3 and FIG. 4 depict in each case a plan view of embodiments of a functional element 5 of the composite pane 100 of FIG. 1 before integration of the functional element 5 into the composite pane 100, wherein the electrical contacting of the functional element 5 can also be seen. FIG. 5 depicts a cross-section through the functional element of FIG. 3 or FIG. 4 along the section line EE'. For simplification, in FIG. 5, elements behind the section plane have been omitted. For simplification, FIG. 3 and FIG. 4 do not depict in which first region the second carrier film 15, the second planar electrode 13, and the active layer 11 have a first cutback 20 at the first side edge 4.1, and in which second region the first carrier film 14, the first planar electrode 12, and the active layer 11 have a second cutback 21 at the first side edge 4.1. The multilayer film of the functional element 5 is depicted transparent in FIG. 3 and FIG. 4 such that the bus bars 18, 19 can be seen. The controllable functional element 5 is a multilayer film consisting of an active layer 11 between two planar electrodes 12, 13 and two carrier films 14, 15. The active layer 11 contains a polymer matrix with liquid crystals dispersed therein, which align themselves as a function of the electrical voltage applied to the planar electrodes, by which means the optical properties can be adjusted. The carrier films 14, 15 are made of PET and have a thickness of, for example, 0.2 mm. The carrier films 14, 15 are provided with a coating of ITO facing the active layer 11 and having a thickness of approx. 30 nm, which form the first planar electrode 12 and the second planar electrode 13. The planar electrodes 12, 13 can be connected to the on-board electrical system via bus bars 18, 19 and connecting cables (not shown). The bus bars 18, 19 are formed by a silver-containing screen print. The first planar electrode 12 has an isolation line 16 with a width of 200 μm in each case, which is introduced by means of a laser process and which divides the first planar electrode 12 into two segments 17. In the embodiment depicted in FIG. 3, the isolation line 16 has, starting from the first side edge 4.1 of the functional element, a vertical section 16.1 and a horizontal section 16.2. In the embodiment depicted in FIG. 4, the isolation line 16 has, starting from the first side edge 4.1 of the functional element, two vertical sections 16.1 and two horizontal sections 16.2, with the vertical sections 16.1 and the horizontal sections 16.2 alternating. In the installed state of the functional element 5, the vertical sections 16.1 of the isolation line 16 are located in the region of the masking prints 9 (see FIG. 1). The vertical sections 16.1 of the isolation lines 16 run substantially perpendicular to the first side edge 4.1, and the horizontal sections 16.2 of the isolation lines 16 run substantially parallel to the first side edge 4.1. The isolation lines 16 electrically isolate the segments 17 from one another. The number of segments 17 can be freely selected depending on the application or customer requirements. The first planar electrode 12 has, in each case, per segment 17, one first bus bar 18, thus, in FIGS. 3 and 4, in each case, a total of two first bus bars 18. Here, the first of the first bus bars 18 in the embodiments depicted in FIG. 3 and FIG. 4 is, in each case arranged at the first side edge 4.1 adjacent the fourth side edge 4.4; the second of the first bus bars 18 is arranged at the side edge 4.1 adjacent the first of the first bus bars 18; and the second bus bar 19 is arranged at the first side edge 4.1 adjacent the second side edge 4.2.

The first side edge 4.1 of the functional element 5, which accommodates the first bus bars 18 and the second bus bar 19, is, in the installed position of the functional element 5 in a composite pane 100 implemented as a roof panel, arranged at the front roof edge D or the rear roof edge D', and is, in the installed position of the functional element 5 in a composite pane 100 implemented as a windshield, arranged at the roof edge.

FIG. 5 depicts a cross-section along the section line EE' in FIGS. 3 and 4, showing the arrangement of the first bus bars 18 on the first planar electrode 12 and the arrangement of the second bus bar 19 on the second planar electrode 13. For simplification, in FIG. 5, elements behind the section plane have been omitted. The second carrier film 15, the second planar electrode 13, and the active layer 11 are removed in the region of the functional element 5 that is provided for the first bus bars 18. Thus, the second carrier film 15, the second planar electrode 13, and the active layer 11 have a first cutback 20 at the first side edge 4.1 in this first region. The first bus bars 18 ensure the electrical contacting of the individual segments 17 of the first planar electrode 12.

The second bus bar 19 ensures the electrical contacting of the second planar electrode 13. A single second bus bar 19 suffices in this case for the electrical contacting of the functional element 5. According to FIG. 5, in the region of the second bus bar 19, the first carrier film 14 together with the first planar electrode 12 is removed by cutting back the film. The active layer 11 is likewise removed in this region. Thus, at the first side edge 4.1 in this region, the first carrier film 14, the first planar electrode 12, and the active layer 11 have a second cutback 21. The second bus bar 19 is printed onto the exposed second planar electrode 13 and thus makes electrical contact with the second planar electrode 13 in this region.

FIG. 6 depicts a plan view of another embodiment of a composite pane 100 according to the invention, which is implemented as a roof panel. The embodiment depicted in FIG. 6 differs from that depicted in FIG. 1 only in that the functional element has three isolation lines 16 and the first planar electrode 12 is thus divided into four segments 17, each of which is contacted by means of a first bus bar 18.

FIG. 7 depicts a plan view of an embodiment of a functional element 5 of the composite pane 100 of FIG. 6 before integration of the functional element 5 into the composite pane 100, wherein the electrical contacting of the functional element 5 can also be seen. FIG. 8 depicts a cross-section through the functional element of FIG. 7 along the section line EE'. For simplification, in FIG. 8, elements behind the section plane have been omitted. For simplification, FIG. 7 does not depict in which first region the second carrier film 15, the second planar electrode 13, and the active layer 11 have a first cutback 20 at the first side edge 4.1, and in which second region the first carrier film 14, the first planar electrode 12, and the active layer 11 have a second cutback 21 at the first side edge 4.1. The multilayer film of the functional element 5 is depicted transparent in FIG. 7 such that the bus bars 18, 19 can be seen. The embodiment of the functional element 5 depicted in FIGS. 7 and 8 differs from that depicted in FIGS. 4 and 5 only in that the functional element has three isolation lines 16 and the first planar electrode 12 is thus divided into four segments 17, each of which is contacted by means of a first bus bar 18. The first of the first bus bars 18 in the embodiments depicted in FIGS. 7 and 8 is in each case arranged at the first side edge 4.1 adjacent the fourth side edge 4.4; the second of the first bus bars 18 is arranged at the first side edge 4.1 adjacent the first of the first bus bars 18; the third first bus bar 18 is arranged adjacent the second first bus bar 18; the fourth first bus bar 18 is arranged adjacent the third first bus bar 18; and the second bus bar 19 is arranged at the first side edge 4.1 adjacent the second side edge 4.2. The first bus bars 18 are thus arranged in a row at the first side edge 4.1 starting from the fourth side edge 4.4, and the second bus bar 19 is arranged at the corner in which the first side edge 4.1 abuts the second side edge 4.2.

FIG. 9 depicts a plan view of an embodiment of a functional element 5 of the composite pane 100 of FIG. 6 before integration of the functional element 5 in the composite pane 100, wherein the electrical contacting of the functional element 5 can also be seen. FIG. 10 depicts a cross-section through the functional element of FIG. 9 along the section line EE'. For simplification, in FIG. 10, elements behind the section plane have been omitted. For simplification, FIG. 9 does not depict in which first region the second carrier film 15, the second planar electrode 13, and the active layer 11 have a first cutback 20 at the first side edge 4.1, and in which second region the first carrier film 14, the first planar electrode 12, and the active layer 11 have a second cutback 21 at the first side edge 4.1. The multilayer film of the functional element 5 is depicted transparent in FIG. 9 such that the bus bars 18, 19 can be seen. The embodiment of the functional element 5 depicted in FIGS. 9 and 10 differs from that depicted in FIGS. 7 and 8 only in that the second bus bar 19 in the embodiment depicted in FIGS. 9 and 10 is arranged at the first side edge 4.1 adjacent the fourth first bus bar 18. Thus, the cutbacks 20 and 21 for electrical contacting of the functional element 5 are arranged directly adjacent one another.

FIG. 11 depicts a perspective view of an embodiment of a functional element 5 according to the invention. In the embodiment depicted in FIG. 11, the functional element 5 is configured as depicted in FIG. 3 or 4. In FIG. 11, due to the perspective view, the first cutback 20 for the region-wise exposure of the first planar electrode 12 of the functional element 5 and the second cutback 21 for the region-wise exposure of the second planar electrode 13 of the functional element 5 can be clearly seen.

FIG. 12 depicts a perspective view of another embodiment of a functional element 5 according to the invention. This differs from that depicted in FIG. 11 only in that in the embodiment depicted in FIG. 12, the functional element 5 has a first flat conductor 22 for connecting the first bus bars 18 to an external voltage source and a second flat conductor 23 for connecting the second bus bars 19 to an external voltage source. The first flat conductor 22 is implemented as a flexible printed circuit. Arranging the first bus bars 18 in a row at the first side edge 4.1 of the functional element 5 results in a compact arrangement and all first bus bars 18 can be connected to an external voltage source by means of a single first flat conductor 22 implemented as a flexible printed circuit.

FIG. 13 depicts a perspective view of another embodiment of a functional element 5 according to the invention. This differs from that depicted in FIG. 11 only in that the functional element 5 is configured as depicted in FIG. 9. In FIG. 13, due to the perspective view, the first cutback 20 for the region-wise exposure of the first planar electrode 12 of the functional element 5 and the second cutback 21 for the region-wise exposure of the second planar electrode 13 of the functional element 5 can be clearly seen.

FIG. 14 depicts a perspective view of another embodiment of a functional element 5 according to the invention. This differs from that depicted in FIG. 12 only in that the functional element 5 is configured as depicted in FIG. 9. In FIG. 14, due to the perspective view, the first cutback 20 for the region-wise exposure of the first planar electrode 12 of the functional element 5 and the second cutback 21 for the region-wise exposure of the second planar electrode 13 of the functional element 5 can be clearly seen.

FIG. 15 depicts a plan view of a composite pane 100 according to the invention, which is implemented as a windshield of a motor vehicle. FIG. 16 depicts a cross-sectional view of the windshield of FIG. 15 along the section line C'C. The windshield comprises a first pane 1, serving as the outer pane, and a second pane 2, serving as the inner pane. The inner pane is the pane directed toward the vehicle's interior, whereas the outer pane points toward the vehicle's surroundings. The first pane 1 and the second pane 2 are joined to one other via an intermediate layer 3. The first pane 1 has a thickness of 2.1 mm and is made of a green-colored soda lime glass. The second pane 2 has a thickness of 1.6 mm and is made of a clear soda lime glass. The composite pane as a windshield has a front roof edge D facing the roof in the installed position and an engine edge M facing the engine compartment in the installed position.

The windshield is equipped with a functional element 5 as an electrically controllable sun visor that is installed in a region above the central field of view B (as defined in ECE-R43). The sun visor is formed by a functional element 5 according to the invention, which is integrated into the intermediate layer 3 and in which the first planar electrode 12 is divided into four segments 17 by means of three isolation lines 16. The height of the sun visor is, for example, 21 cm. The intermediate layer 3 comprises a total of three thermoplastic bonding films 6, 7, 8, which are in each case implemented as a thermoplastic film with a thickness of 0.38 mm made of PVB. The first thermoplastic bonding film 6 is bonded to the first pane 1; the second thermoplastic bonding film 7, to the second pane 2. The thermoplastic frame film 8 positioned therebetween has a cutout, into which the cut-to-size PDLC multilayer film is inserted with an exact fit, in other words, flush on all sides. The third thermoplastic layer thus forms, so to speak, a sort of passepartout for the functional element 5, which is thus encapsulated all around in a thermoplastic material and is protected thereby. The first thermoplastic bonding film 6 optionally has a tinted region 10 that is arranged between the functional element 5 and the first pane 1. The light transmittance of the windshield is thus additionally reduced in the region of the sun visor, and the milky appearance of the PDLC functional element 5 is mitigated in the diffusive state. The aesthetics of the windshield thus become significantly more attractive. In the case shown, the lower edges of the tinted region 10 and of the PDLC functional element 5 are arranged flush. This is, however, not necessarily the case.

The composite pane according to the invention has, in its embodiment as a windshield in accordance with FIG. 15, a circumferential masking print 9, which conceals both the adhesive connection of the windshield to the vehicle body and the electrical contacting of the planar electrodes of the functional element 5. The circumferential peripheral masking print 9 is implemented by an opaque enamel on the interior-side surfaces (facing the interior of the vehicle in the installed position) of the first pane 1 and the second pane 2. The distance of the functional element 5 from the front roof edge D and the side edges of the windshield is less than the width of the masking print 9 such that the side edges 4.1, 4.2, 4.4 of the functional element 5—with the exception of the side edge 4.3 pointing toward the central field of view B—are concealed by the masking print 9. The electrical connections and bus bars are also reasonably attached in the region of the masking print 9 and thus advantageously concealed.

In a particularly convenient embodiment, the functional element 5 is controlled by a capacitive switch area arranged in the region of the sun visor, wherein the driver specifies the degree of darkening by means of the location at which he touches the pane. Alternatively, the sun visor can even be controlled by contactless methods, for example, by gesture recognition, or as a function of the pupil or eyelid state detected by a camera and suitable evaluation electronics.

A so-called "high flow PVB", which has stronger flow behavior compared to standard PVB films, can preferably be used for the thermoplastic bonding films 6, 7 and the thermoplastic frame film 8. The layers thus flow more strongly around the functional element 5, creating a more homogeneous visual impression, and the transition from the functional element 5 to the frame film 8 is less conspicuous. The "high flow PVB" can be used for all or for only one or more of the thermoplastic films 6, 7, 8 having direct contact with the functional element 5.

FIG. 17 depicts a circuit of an embodiment of a functional element 5 according to the invention. The functional element 5, whose circuit is depicted in FIG. 17, is configured as depicted in FIG. 14. The four segments of the first planar electrode 12, which are designated R1, R2, R3, and R4 in the circuit, are connected in parallel and connected to a first pole of a voltage source via four first bus bars 18 by means of a first flat conductor 22 in the form of a flexible printed circuit (designated E1 in FIG. 17). The second planar electrode 13 is connected to the second pole of the voltage source opposite the first pole by means of a second flat conductor 23 (designated E2 in FIG. 17) via a second bus bar 19.

FIG. 18 depicts, using a flow chart, an exemplary embodiment of the method according to the invention for producing a functional element 5 according to the invention having electrically controllable optical properties having a plurality of side edges 4.1, 4.2, 4.3, 4.4, comprising the steps:

I Providing a stacking sequence consisting of a first carrier film 14, a first planar electrode 12, an active layer 11, a second planar electrode 13, and a second carrier film 15, II Introducing one isolation line 16 into the first planar electrode 12 of the functional element 5, wherein the isolation line 16 divides the first planar electrode into at least two segments 17, III Providing the second carrier film 15, the second planar electrode 13, and the active layer 11 with a first cutback 20 on a first side edge 4.1 in a first region and providing the first carrier film 14, the first planar electrode 12, and the active layer 11 with a second cutback 21 in a second region, IV Attaching, in each case, a first bus bar 18 per segment 17 on the first planar electrode 12 such that the first bus bars 18, in a through view, are arranged in a row adjacent one another in the region of the first cutback 20 on the first planar electrode 12, and attaching at least one second bus bar 19 on the second planar electrode 13 such that the at least one second bus bar 19, in a through view, is arranged in the region of the second cutback 21 on the second planar electrode 13.

LIST OF REFERENCE CHARACTERS 1 first pane
2 second pane
3 intermediate layer
4.1 first side edge of the functional element 5
4.2 second side edge of the functional element 5
4.3 third side edge of the functional element 5
4.4 fourth side edge of the functional element 5
5 functional element with electrically controllable optical properties
6 first thermoplastic bonding film
7 second thermoplastic bonding film
8 thermoplastic frame film, third thermoplastic bonding film
9 masking print
10 tinted region of the first thermoplastic bonding film
11 active layer of the functional element 5
12 first planar electrode of the functional element 5
13 second planar electrode of the functional element 5
14 first carrier film
15 second carrier film
16 isolation lines
16.1 vertical sections of the isolation lines 16
16.2 horizontal sections of the isolation lines 16
17 segments
18 first bus bar 19 second bus bar
20 first cutback to expose the first planar electrode 12 of the functional element 5
21 second cutback to expose the second planar electrode 13 of the functional element 5
22 first flat conductor for connecting the first bus bars 18 to an external voltage source
23 second flat conductor for connecting the second bus bar 19 to an external voltage source
100 composite pane
B field of view
D front roof edge
D' rear roof edge
M engine edge
S side edges
C-C', E-E' section line

The invention claimed is:

1. A functional element having electrically controllable optical properties having a plurality of side edges, comprising a stacking sequence consisting of
   a first carrier film,
   a first planar electrode that is divided by at least one isolation line into at least two segments,
   an active layer,
   a second planar electrode, and
   a second carrier film,
   wherein
      on a first side edge in a first region, the second carrier film, the second planar electrode, and the active layer have a first cutback and in a second region, the first carrier film, the first planar electrode, and the active layer have a second cutback,
      a group of first bus bars electrically conductively contacts the first planar electrode, and each segment of the first planar electrode is electrically conductively contacted by a bus bar from the group of the first bus bars,
      at least one second bus bar electrically conductively contacts the second planar electrode,
      the first bus bars, in a through view, are arranged adjacent one another in a row in the region of the first cutback on the first planar electrode, wherein the first bus bars are electrically separated from one another by the at least one isolation line, and
      the at least one second bus bar, in a through view, is arranged in the region of the second cutback on the second planar electrode.

2. The functional element according to claim 1, wherein the at least one isolation line is divided, starting from the first side edge, into at least one vertical section that runs substantially perpendicular to the first side edge, and into at least one horizontal section that runs substantially parallel to the first side edge.

3. The functional element according to claim 2, wherein the at least one isolation line is divided into two vertical sections that run substantially perpendicular to the first side edge, and into two horizontal sections that run substantially parallel to the first side edge, and the two vertical sections and the horizontal sections alternate.

4. The functional element according to claim 1, wherein the first cutback and the second cutback are arranged directly adjacent one another.

5. The functional element according to claim 1, wherein the group of first bus bars, and the at least one second bus bars comprise an electrically conductive structure and have a thickness of 5 μm to 40 μm.

6. The functional element according to claim 5, wherein the electrically conductive structure contains silver.

7. The functional element according to claim 1, wherein the first planar electrode and the second planar electrode contain at least one metal, one metal alloy, or one transparent conductive oxide and have a thickness of 10 nm to 2 μm.

8. The functional element according to claim 7, wherein the one transparent conductive oxide is a transparent conductive oxide.

9. The functional element according to claim 7, wherein the first planar electrode and the second planar electrode each have a thickness of 10 nm to 2 μm.

10. The functional element according to claim 1, wherein the active layer contains or consists of liquid crystals.

11. The functional element according to claim 10, wherein the liquid crystals are polymer dispersed liquid crystals (PDLC).

12. The functional element according to claim 1, further comprising a first flat conductor and a second flat conductor, wherein by means of the first flat conductor, the first planar electrode can be contacted is contactable with a first pole of a voltage source via the group of the first bus bars and by means of the second flat conductor, the second planar electrode can be contacted is contactable via the at least one second bus bar with a second pole of the voltage source opposite the first pole via the at least one second bus bar, and wherein the first flat conductor is implemented as a flexible printed circuit.

13. A composite pane having a functional element having electrically controllable optical properties, at least comprising a first pane and a second pane that are joined to one another via an intermediate layer and a functional element in accordance with claim 1 that is embedded in the intermediate layer.

14. The composite pane according to claim 13, wherein the intermediate layer has a first thermoplastic bonding film, which is arranged between the functional element and the first pane, and has a second thermoplastic bonding film, which is arranged between the functional element and the second pane.

15. The composite pane according to claim 13, wherein the composite pane is a roof panel of a motor vehicle comprising a front roof edge, a rear roof edge, and two side edges, the functional element is designed as a large area shading of the roof panel, and wherein the functional element is arranged in the composite pane such that the first side edge of the functional element is aligned parallel to the front roof edge and/or parallel to the rear roof edge and that the first side edge of the functional element is aligned adjacent the front roof edge or the rear roof edge.

16. The composite pane according to claim 13, wherein the composite pane is a windshield of a motor vehicle, comprising an engine edge, a front roof edge, and two side edges, the functional element is designed as a sun visor in the vicinity of the front roof edge, and wherein the functional element is arranged in the composite pane such that the first side edge of the functional element is aligned parallel to and adjacent the roof edge.

17. A method for producing a functional element according to claim 1 having electrically controllable optical properties having a plurality of side edges the method comprising:
   a) providing a stacking sequence consisting of a first carrier film, a first planar electrode, an active layer, a second planar electrode, and a second carrier film, b) forming at least one isolation line that divides the first planar electrode into at least two segments is introduced into the first planar electrode of the functional element, c) on a first side edge in a first region, providing the second carrier film, the second planar electrode, and the active layer with a first cutback, and in a second region, providing the first carrier film, the first planar electrode, and the active layer are provided with a second cutback, and d) attaching a first bus bar per segment is attached in each case on the first planar electrode such that the group of first bus bars, in a through view, are arranged adjacent one another in a row in the region of the first cutback on the first planar electrode, and attaching at least one second bus bar is attached on the second planar electrode such that the at least one second bus bar, in a through view, is arranged in the region of the second cutback on the second planar electrode.

18. The method according to claim 17, further comprising attaching a first flat conductor on the group of the first bus bars, by means of which the group of the first bus bars is contactable with a first pole of a voltage source and of attaching a second flat conductor on the at least one second bus bar, by means of which the second planar electrode is contactable with a second pole of the voltage source opposite the first pole.

19. A method comprising providing an interior glazing or exterior glazing in a vehicle or a building with a composite pane having a functional element having electrically controllable optical properties according to claim 1 and the functional element having electrically controllable optical properties forms a sun screen or a privacy screen.

* * * * *